(12) United States Patent
Becker et al.

(10) Patent No.: US 10,697,393 B2
(45) Date of Patent: Jun. 30, 2020

(54) CYLINDER LINER FOR AN INTERNAL COMBUSTION ENGINE

(71) Applicant: INNIO Jenbacher GmbH & Co OG, Jenbach (AT)

(72) Inventors: Florian Becker, Kolsassberg (AT); Tomasz Szafranski, Warsaw (PL); Jakub Korotko, Otwock (PL); Radoslaw Kaniecki, Pultsk (PL)

(73) Assignee: INNIO JENBACHER GMBH & CO OG, Jenbach (AT)

( * ) Notice: Subject to any disclaimer, the term of this patent is extended or adjusted under 35 U.S.C. 154(b) by 0 days.

(21) Appl. No.: 15/737,446

(22) PCT Filed: Jun. 30, 2016

(86) PCT No.: PCT/AT2016/050237
§ 371 (c)(1),
(2) Date: Dec. 18, 2017

(87) PCT Pub. No.: WO2017/004643
PCT Pub. Date: Jan. 12, 2017

(65) Prior Publication Data
US 2019/0003415 A1    Jan. 3, 2019

(30) Foreign Application Priority Data

Jul. 3, 2015 (AT) ..................... 430/2015

(51) Int. Cl.
*F02F 1/16* (2006.01)
*F16J 10/04* (2006.01)

(52) U.S. Cl.
CPC ............ *F02F 1/16* (2013.01); *F16J 10/04* (2013.01)

(58) Field of Classification Search
CPC .... F02F 1/16; F02F 11/002; F02F 1/10; F02F 1/163; F02F 11/005; F02F 1/004
See application file for complete search history.

(56) References Cited

U.S. PATENT DOCUMENTS

| 3,086,505 A | 4/1963 | Bovard |
| 3,474,709 A | 10/1969 | Hamlin |
| 3,603,213 A | 9/1971 | Tootle et al. |
| 4,109,617 A | 8/1978 | Ernest |
| 4,244,330 A | 1/1981 | Baugh et al. |
| 4,385,595 A | 5/1983 | Shaw |

(Continued)

FOREIGN PATENT DOCUMENTS

| DE | 2 010 062 A1 | 10/1970 |
| DE | 1 957 811 A1 | 5/1971 |

(Continued)

OTHER PUBLICATIONS

First Office Action issued in connection with corresponding AT Application No. A430/2015 dated May 13, 2016.

(Continued)

*Primary Examiner* — Long T Tran
(74) *Attorney, Agent, or Firm* — Fletcher Yoder, P.C.

(57) ABSTRACT

A cylinder liner for an internal combustion engine, with a collar, whereby the cylinder liner, on its lateral surface, is provided with a protruding flow-guiding device axially spaced from the collar, having at least one axial opening.

18 Claims, 7 Drawing Sheets

(56) References Cited

U.S. PATENT DOCUMENTS

Figure 1:
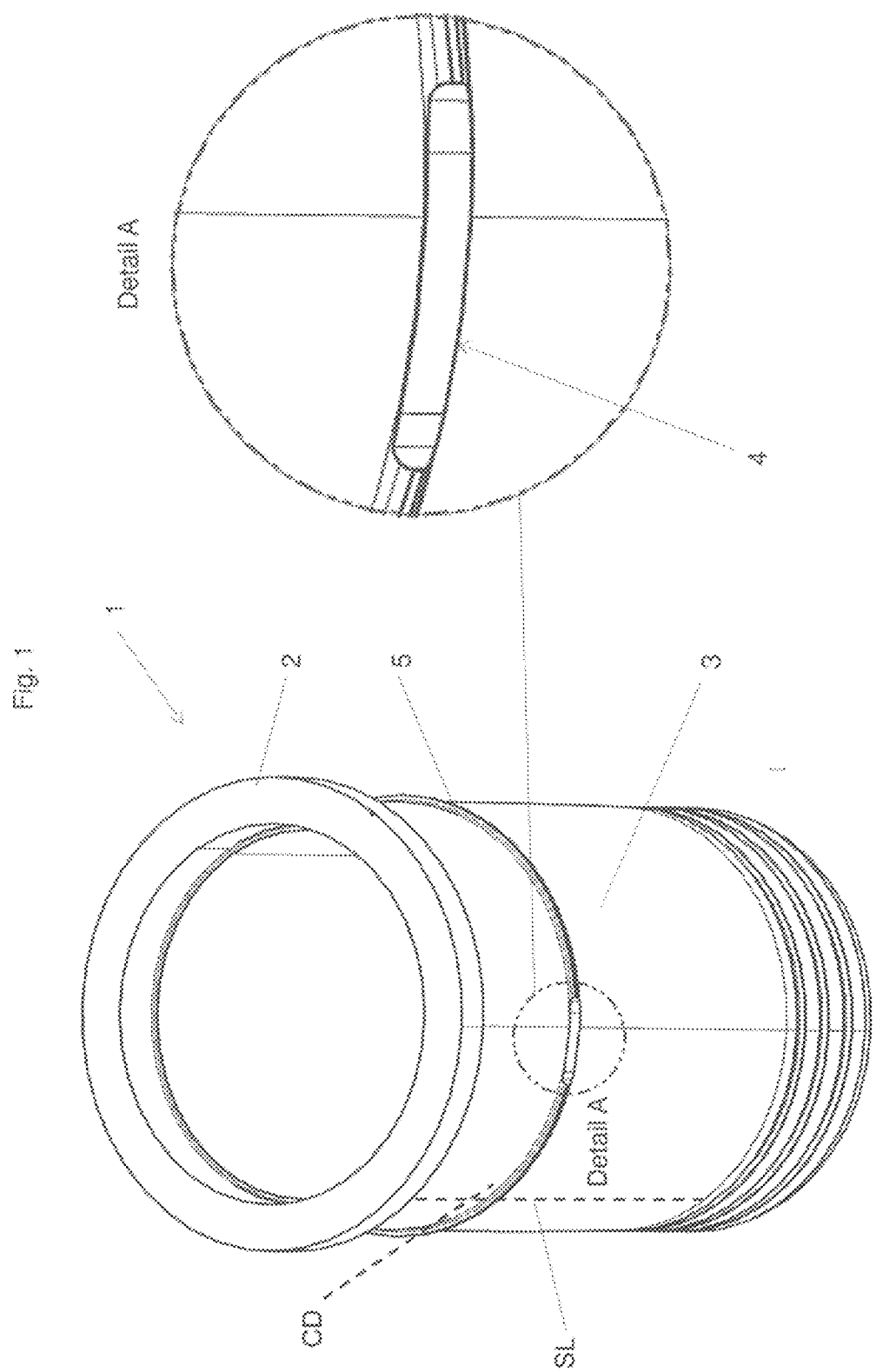

| | | | | |
|---|---|---|---|---|
| 4,640,236 | A | * | 2/1987 | Nakano .................. F02F 1/163 123/193.3 |
| 5,115,771 | A | | 5/1992 | Ozawa |
| 5,150,668 | A | | 9/1992 | Bock |
| 5,251,578 | A | * | 10/1993 | Kawauchi ................ F02F 1/16 123/41.79 |
| 5,301,423 | A | | 4/1994 | Clark et al. |
| 5,337,709 | A | | 8/1994 | Clark et al. |
| 5,361,730 | A | | 11/1994 | Clark et al. |
| 5,505,167 | A | * | 4/1996 | Kennedy ................ F02F 1/163 123/41.84 |
| 5,979,374 | A | | 11/1999 | Jackson |
| 6,079,375 | A | * | 6/2000 | Duerr ..................... F02F 1/14 123/41.72 |
| 6,145,481 | A | * | 11/2000 | Bock ..................... F02F 1/163 123/41.79 |
| 7,104,226 | B2 | | 9/2006 | Endoh et al. |
| 7,131,417 | B1 | * | 11/2006 | Jones .................... F02F 1/102 123/193.2 |
| 9,121,365 | B1 | * | 9/2015 | Wagner .................. F02F 1/186 |
| 2012/0240883 | A1 | | 9/2012 | McGiffin et al. |
| 2015/0377178 | A1 | * | 12/2015 | Bussieres ................ F02F 1/16 123/41.72 |

FOREIGN PATENT DOCUMENTS

| | | |
|---|---|---|
| EP | 0 450 067 B1 | 7/1993 |
| EP | 0 614 009 A1 | 9/1994 |
| EP | 1 600 621 A2 | 11/2005 |
| WO | 91/03632 A1 | 3/1991 |
| WO | 94/20740 A1 | 9/1994 |

OTHER PUBLICATIONS

European Office Action for EP Application No. 16 740 948.1 dated Aug. 30, 2019; 5 pgs.

PCT International Search Report and Written Opinion; Application No. PCT/AT2016/050237; dated Sep. 26, 2016; 4 pages.

\* cited by examiner

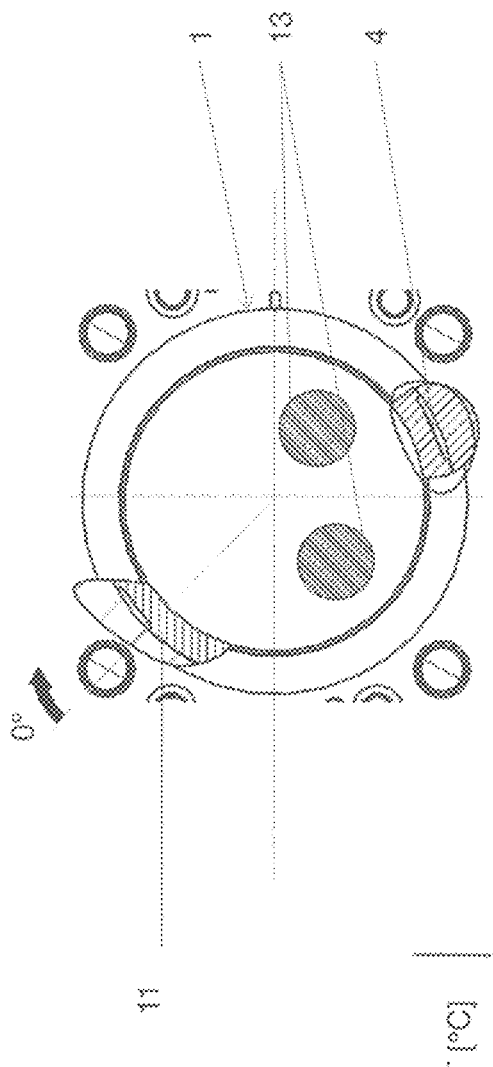
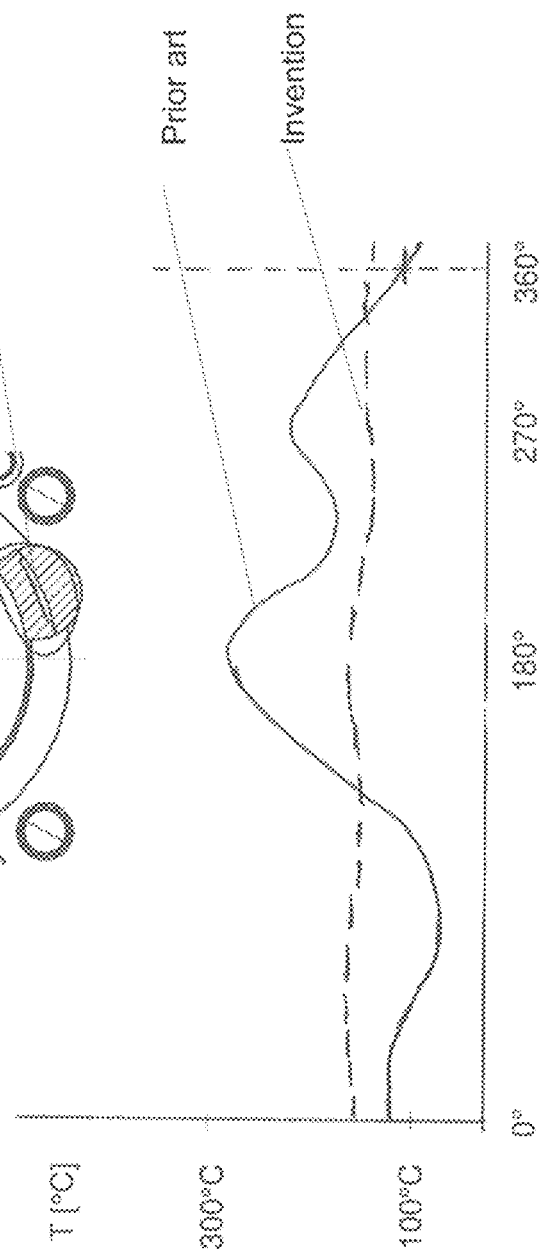
Fig. 7A
Fig. 7B

CYLINDER LINER FOR AN INTERNAL COMBUSTION ENGINE

The invention relates to a cylinder liner for an internal combustion engine with the features of the preamble of claim 1 and an arrangement of a cylinder liner and a crankcase.

A cylinder liner is an insert in a crankcase of a reciprocating piston engine (internal combustion engine) which forms the bearing surface for a piston of the reciprocating piston engine. Cylinder liners are commonly used because the material from which the crankcase is made does not meet the tribological requirements for a bearing surface for piston movement. It is thus useful to arrange a cylinder liner in a cylinder bore in the crankcase. There are various ways to install a cylinder liner in the crankcase. In the case of passenger car engines, for example, it is customary to pour a cylinder liner into the crankcase. For larger internal combustion engines, for example stationary internal combustion engines for power generation, cylinder liners are detachably inserted into a cylinder bore in the crankcase.

With regard to the type of cooling, a distinction is made between "wet" and "dry" cylinder liners. Wet cylinder liners are surrounded directly by a coolant to cool the internal combustion engine. For this purpose, a gap is provided between the outer jacket of the cylinder liner and the wall of the bore in which the cylinder liner is inserted. A wet cylinder liner is therefore used with a gasket.

Dry cylinder liners, which generally have a smaller wall thickness than wet cylinder liners, are usually shrunk into a cylinder bore of the crankcase. The heat dissipation from the cylinder formed by the cylinder liner occurs in this case via heat conduction into the crankcase.

In wet cylinder liners, there are various possibilities of installation in the receptacle of the crankcase: so-called hanging cylinder liners are inserted into a collar forming the upper edge of the cylinder liner in the crankcase. So-called mid-stop liners have a shoulder on their outer circumference in the middle of their longitudinal extension, in which they are mounted in a corresponding receptacle of the crankcase bore. Such a design is known, for example, from U.S. Pat. No. 4,244,330. In bottom-stop cylinder liners, the cylinder liner is mounted on its lower side, i.e. on the cylinder head. Such a design is known from U.S. Pat. No. 4,385,595. Finally, cylinder liners are known which are fixed in the vertical direction via a collar at their upper end, i.e. at the cylinder head end, in the cylinder housing of the internal combustion engine. Such a design is known, for example, from DE 1 957 811.

In operation, cylinder liners are exposed to high thermal and mechanical loads.

The object of the invention is to provide a cylinder liner or an arrangement of a cylinder liner and a crankcase with improved cooling performance.

These objects are achieved by a cylinder liner according to claim 1 and an arrangement of a cylinder liner and a crankcase according to claim 10. Advantageous embodiments are indicated in the dependent claims.

Since the cylinder liner has, at its periphery, a protruding flow-guiding device axially spaced from the collar, provided with at least one axial opening, the cooling of the cylinder liner is improved significantly. Axial opening is understood to mean that the flow-guiding device has an interruption, which allows a flow through the device in a direction of a surface line (i.e. parallel to the longitudinal axis) of the cylinder liner.

It is preferably provided that the protruding flow-guiding device extends in a circumferential direction of the lateral surface of the cylinder liner.

The protruding flow-guiding device may be designed, for example, as a circumferential rib on the cylinder liner.

The flow-guiding device preferably continues fully in the circumferential direction. It would also be conceivable to form the flow-guiding device similarly to a ring placed obliquely on the jacket of the cylinder liner. However, this is very expensive in terms of manufacturing technology.

The flow-guiding device is preferably designed as a rib on the lateral surface of the cylinder liner such that the rib extends annularly and circumferentially from the lateral surface of the cylinder liner.

The protruding flow-guiding device may be designed as a sleeve or ring subsequently applied to the cylinder liner. As the material, metal or plastic are the options considered.

Preferably, however, it is provided that the protruding flow-guiding device forms an integral part of the cylinder liner. In this way, the flow-guiding device can be manufactured via a rotating operation.

Alternatively, the protruding flow-guiding device can be designed as part of the crankcase. In this case, the flow-guiding device protrudes in the form of a rib or the like from a wall of the cylinder bore in the direction of the lateral surface of the cylinder liner.

It is preferably provided that, in the presence of exactly one axial opening, it accounts for a maximum of 25% of the circumference of the protruding flow-guiding device.

In other words, the opening (in the presence of the flow-guiding device in a circumferential direction) extends over a maximum of 90°.

The number of openings depends on the conditions in the installation of the cylinder liner in a crankcase. In particular, the shape and number of cooling channels opening into a gap between the cylinder liner and the crankcase is taken into account.

It is provided that, in the presence of two openings, each of them accounts for a maximum of 20% of the circumference of the protruding flow-guiding device.

In the presence of three openings, it is provided that each of them accounts for a maximum of 18% of the circumference of the protruding flow-guiding device.

It is provided that, in the presence of four openings, each of them accounts for a maximum of 15% of the circumference of the protruding flow-guiding device.

It is preferably provided that the sum of all axial openings is at most 25%, more preferably at most 10%, of the circumference of the protruding flow-guiding device.

It can be provided that the protruding flow-guiding device, based on the longitudinal extent of the cylinder liner, is arranged in the middle of the cylinder liner, and preferably in the upper third of the cylinder liner facing the collar. This ensures that the influencing of the flow of a coolant through the flow-guiding device is maintained to a high degree when the flow reaches zones with higher thermal loads—and these are usually at the height of the collar of a cylinder liner.

It is preferably provided that the cylinder liner is designed as a hanging, wet cylinder liner.

The invention is particularly suitable for use with this design principle.

Protection is also sought for an arrangement of a cylinder liner and a crankcase.

It is preferably provided that the arrangement also comprises a cylinder head. It can preferably be provided that the cylinder liner is mounted in the crankcase via its collar. Furthermore, it can be provided that between at least part of the lateral surface of the cylinder liner and a wall of a receptacle of the cylinder liner in the crankcase, a cavity is formed that can be flowed through by a coolant.

It is preferably provided that the cylinder liner is arranged in a cylinder bore to form a cavity between a lateral surface of the cylinder liner and a wall of the cylinder bore, whereby at least one inflow channel and at least one outflow channel for a coolant are arranged at axially opposite ends of the cylinder bore, whereby, axially in the cavity between the at least one inflow channel and the at least one outflow channel, a flow-guiding device is provided.

This outlines the installation position of a cylinder liner in a cylinder bore. The cylinder liner is cooled by flow around a coolant, which flows into and out of opposite ends of the cylinder bore.

It is preferably provided that the number of axial openings in the flow-guiding device corresponds to the number of outflow channels. In practice, therefore, the openings and the number of outflow channels are matched to each other.

It can be provided that the flow-guiding device is arranged in the wall of the cylinder bore. As already mentioned above, the protruding flow-guiding device can be designed as part of the crankcase. In this case, the flow-guiding device protrudes in the form of a rib or the like from a wall of the cylinder bore in the direction of the lateral surface of the cylinder liner. This variant is more expensive to produce than the placement of the flow-guiding device on the cylinder liner.

If the arrangement comprises a cylinder head, it is preferably provided that the cylinder liner is aligned in the crankcase so that at least one axial opening of the protruding flow-guiding device corresponds with respect to its angular position to the position of at least one outlet valve arranged in the cylinder head.

The area of the outlet valve(s) (when multiple outlet valves per cylinder are provided) is thermally highly stressed.

The preferred arrangement ensures that increased cooling occurs in these areas. For this purpose, installation of the cylinder liner in the correct position with respect to its angular position is required.

It is preferably provided that the crankcase has at least one supply channel and at least one outflow channel for guiding a coolant, which open into a cavity designed between a wall of a receptacle of the cylinder liner in the crankcase and at least part of the lateral surface of the cylinder liner.

It is preferably provided that the cylinder liner is aligned in the crankcase so that at least one axial opening of the protruding flow-guiding device corresponds with respect to its angular position to a supply channel. For this purpose, installation of the cylinder liner in the correct position with respect to its angular position is required.

It is preferably provided that there is a gap between the protruding flow-guiding device and the wall of the receptacle of the cylinder liner in the crankcase.

A gap here means that the flow-guiding device is designed with play in the radial direction relative to the wall of the receptacle of the cylinder liner in the crankcase. The guiding device does not serve as a mechanical guide or support for the cylinder liner in the crankcase, but is designed as a flow-guiding device.

The gap may, for example, be measured as a play of 0.5 mm.

Even with a distance favorable for the installation of the flow-guiding device from the wall of the receptacle of the cylinder liner in the crankcase, it is ensured that the majority of the flow of the coolant through the opening or openings is into the flow-guiding device.

Due to the invention, so-called stagnation zones in the water jacket surrounding the cylinder liner are prevented. In stagnation zones, the flow speed of a coolant is low, whereby only a weak heat transfer occurs between the coolant and the components adjacent to the stagnation zone.

The invention makes it possible to direct the coolant in a targeted way to the thermally most highly stressed zones around the cylinder liner.

Figure 2:
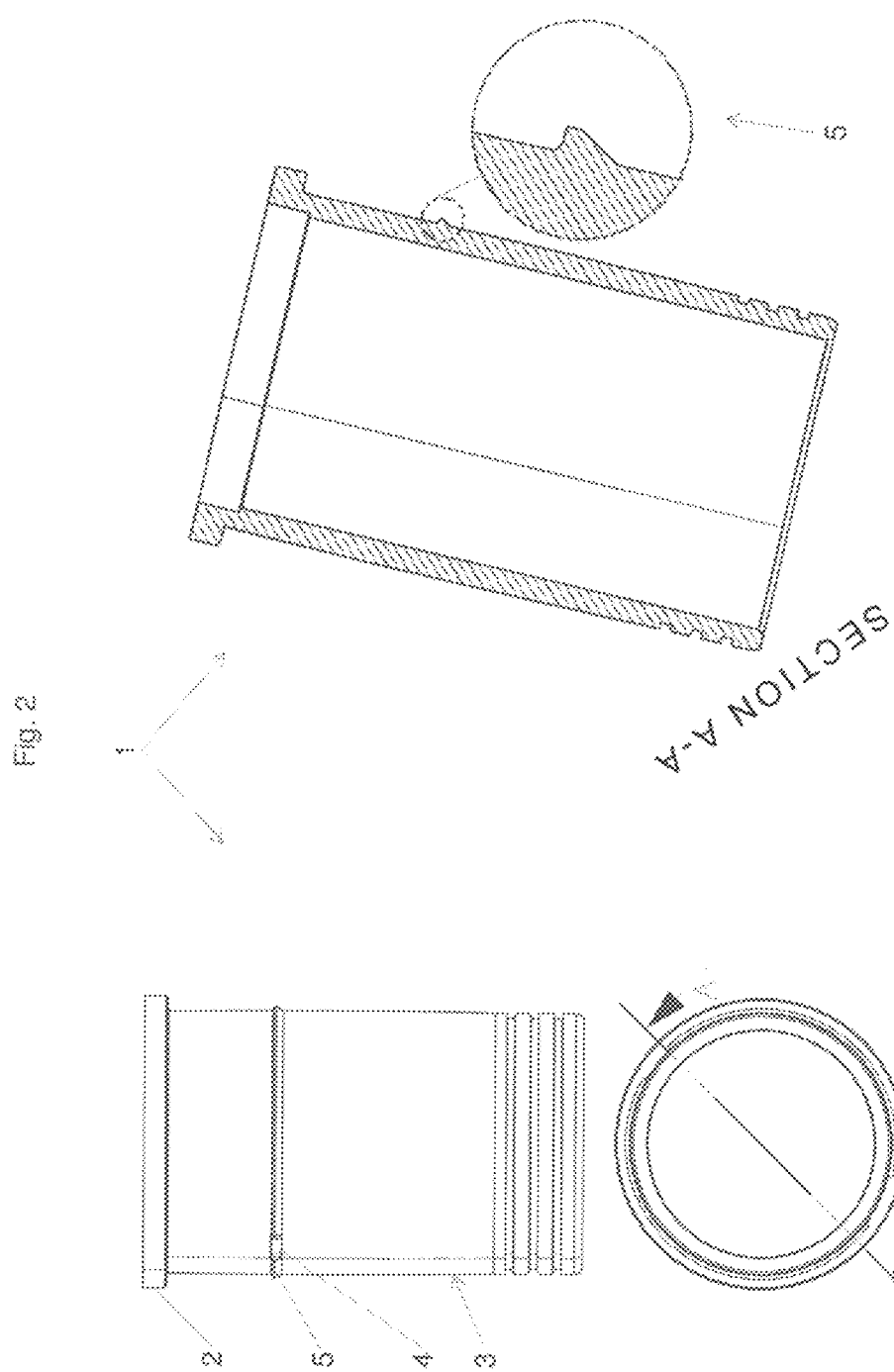
Figure 3:
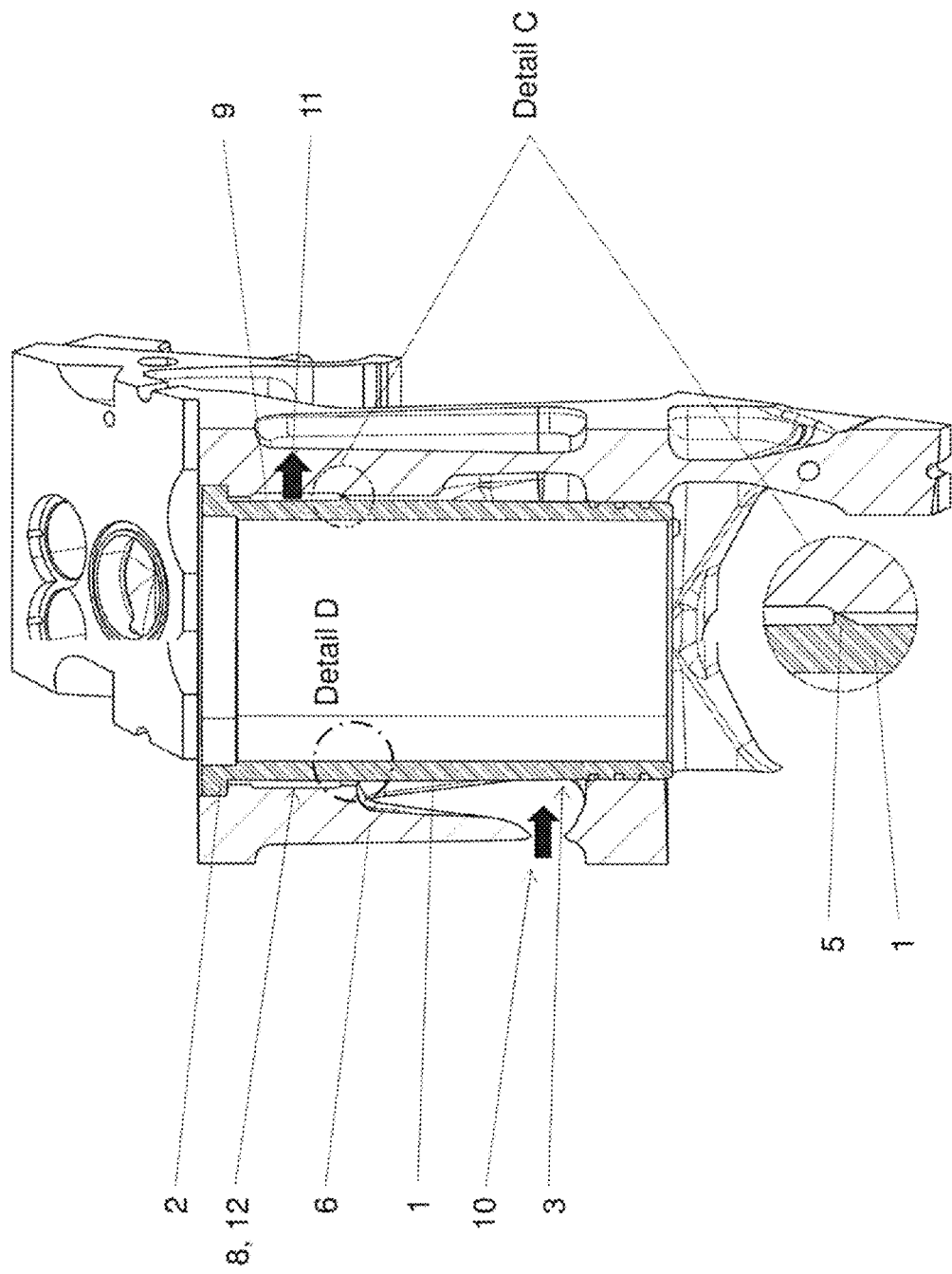
Figure 4:
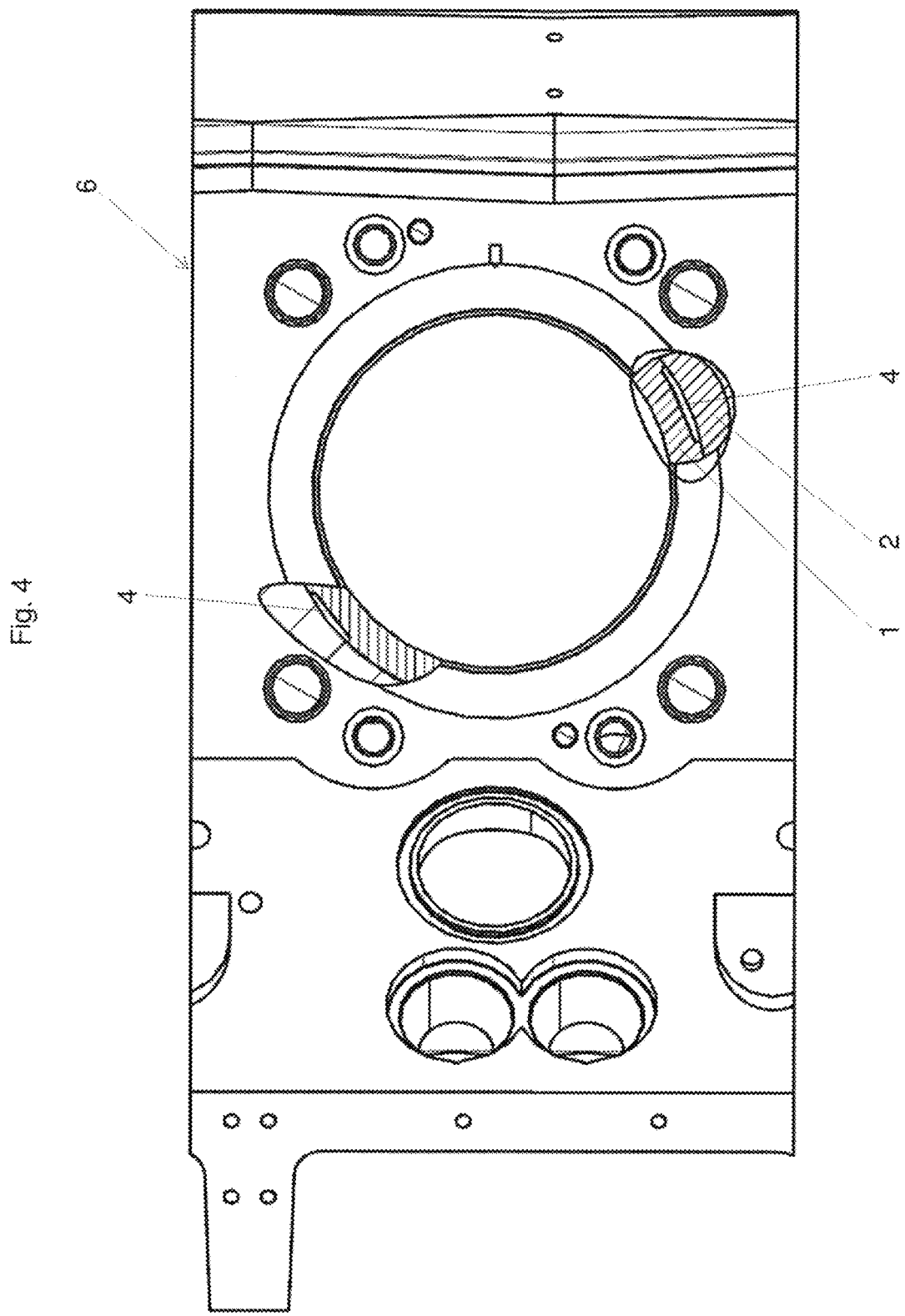
Figure 5:
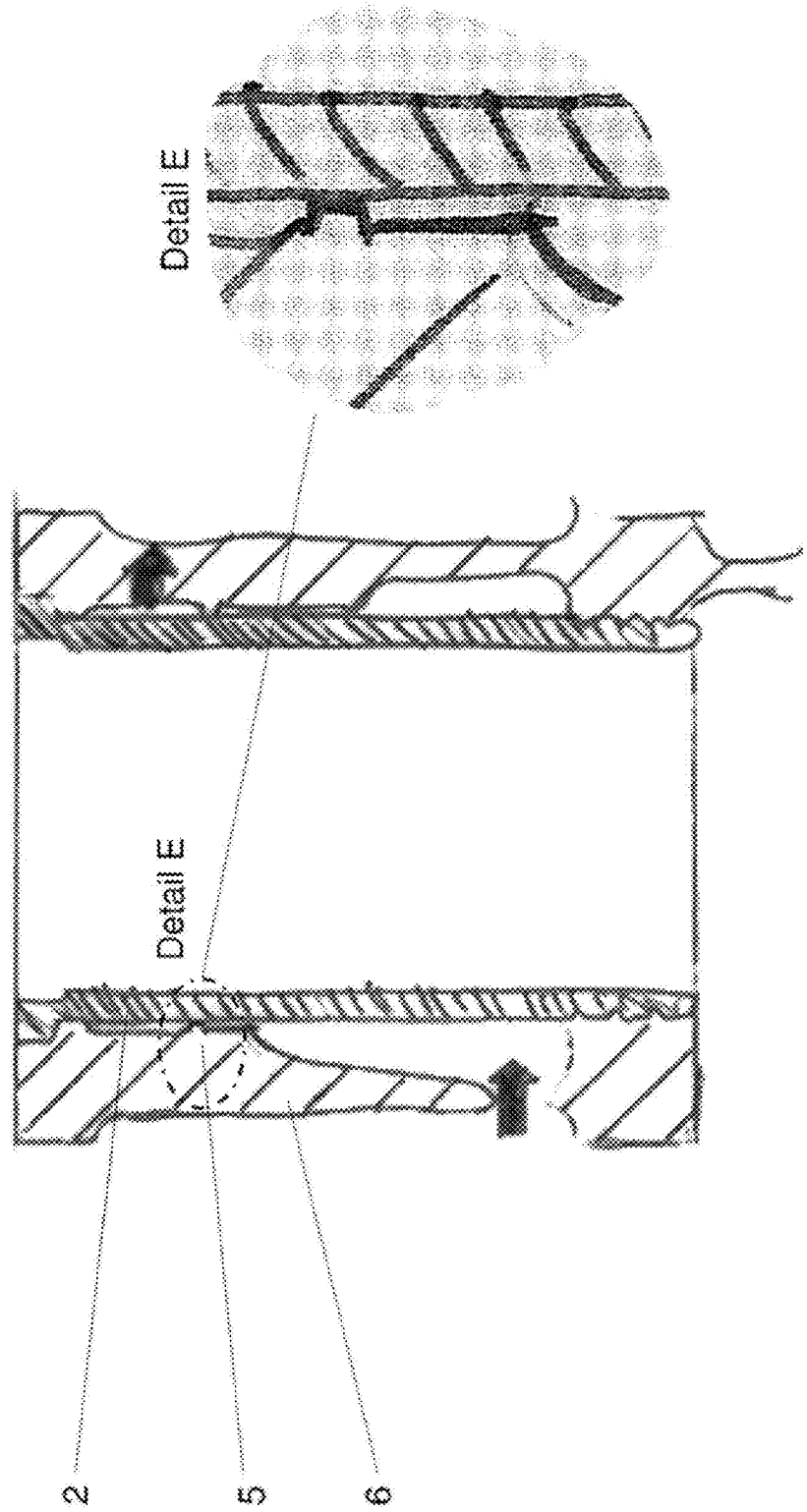
Figure 6:
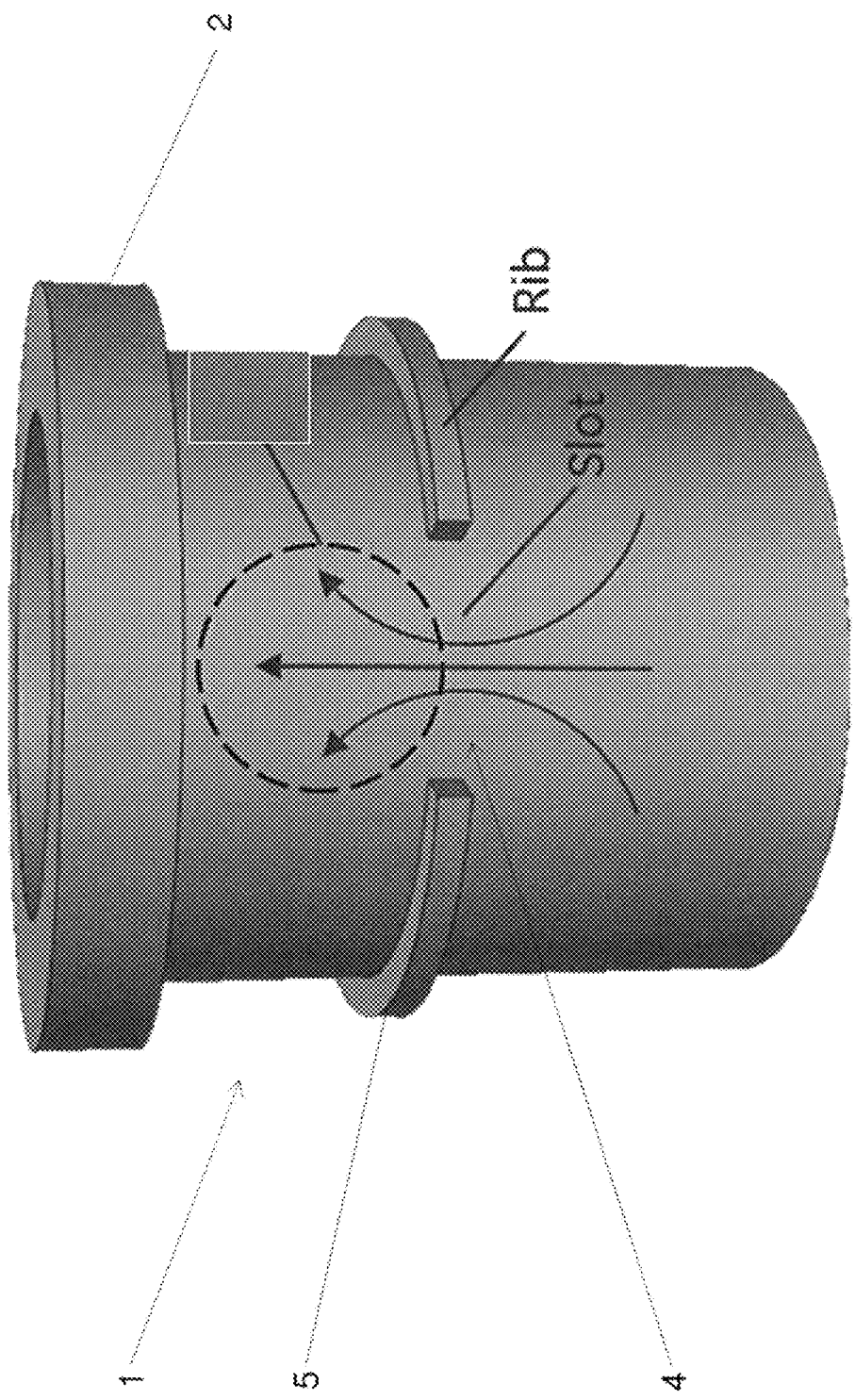

The invention is explained in more detail by the figures below. The drawings in detail:

FIG. 1 a cylinder liner in a first exemplary embodiment,

FIG. 2 the cylinder liner of FIG. 1 in an elevation, a plan view and a cross-section, FIG. 3 an arrangement of a cylinder liner and a crankcase, FIG. 4 a top view of a crankcase, FIG. 5 a cylinder liner and a crankcase in a further exemplary embodiment, FIG. 6 a schematic representation of a cylinder liner in a further exemplary embodiment, FIG. 7a a plan view of a crankcase, FIG. 7b a diagram of temperatures in a cylinder liner in the area of the collar, FIG. 1 shows a cylinder liner 1 according to the invention in a first exemplary embodiment.

On the lateral surface 3, the cylinder liner 1 has a protruding flow-guiding device 5 in the form of a circumferential rib. The protruding flow-guiding device 5 shows an opening 4 in the form of an interruption of the rib forming the flow-guiding device 5. The opening 4 is shown again on the right side of FIG. 1 as an enlarged detail. In the illustration, only one opening 4 facing the viewer can be seen. The cylinder liner 1 may of course have a plurality of openings 4; in the present exemplary embodiment, there are two openings 4.

In the area of the opening 4, the flow-guiding device 5 is removed in this exemplary embodiment up to the lateral surface 3 of the cylinder liner 1. Of course, it is also conceivable to design the opening so that parts of the flow-guiding device 5 still protrude from the lateral surface 3. It is also conceivable to design the opening(s) as bores or gaps in the flow-guiding device 5.

The cylinder liner 1 has a collar 2, via which the cylinder liner 1, when inserted into a cylinder bore of a crankcase of an internal combustion engine (not shown here), can be stored.

Although known from the illustrative geometry, one surface line SL and one circumferential direction CD are shown in FIG. 1.

FIG. 2 shows the cylinder liner 1 of FIG. 1 in an elevation, a plan view and a cross-section.

The cutting guide A-A drawn in the plan view is placed such that the cut on the left side passes through the protruding flow-guiding device 5 and on the right through an opening 4. Since the cut A-A occurs along a diameter of the cylinder liner 1, it can also be seen that the openings 4 are not arranged exactly opposite to the circumference in this exemplary embodiment.

The cross-section of the cylinder liner 1 resulting from the cut A-A can be seen on the right-hand half of FIG. 2. The flow-guiding device 5 is highlighted again as a detail.

FIG. 3 shows the arrangement of a cylinder liner 1 according to the invention in a crankcase 6. The cylinder liner 1 is inserted into a receptacle (the cylinder bore 8) in the crankcase 6 and rests with its collar 2 on a correspondingly shaped shoulder in the crankcase 6.

Between the lateral surface 3 of the cylinder liner 1 and a wall 12 of the cylinder bore 8 in the crankcase 6, a cavity 9 is designed through which a coolant C can flow.

In this cavity 9 designated as a water jacket, a coolant C preferably flows such that the flow direction is from below (i.e. the side facing away from the cylinder head 7) upwards (i.e. the side facing the cylinder head 7).

The detail C shows how the flow-guiding device 5 touches the wall 12 of the cylinder bore 8 in the crankcase at one point on its circumference. At this point, therefore, the flow-guiding device 5 prevents an outflow of a coolant C in the cavity 9 from a supply channel 10 in the direction of an outflow channel 11. The flow is instead directed such that the majority of the flow passes through the opening(s) 4.

Even with a distance favorable for the installation of the flow-guiding device 5 from the wall 12 of the cylinder bore 8 of the cylinder liner 1 in the crankcase 6, it is ensured that the majority of the flow of the coolant C through the opening 4 or openings 4 is into the flow-guiding device 5.

Shown by block arrows is the flow direction of the coolant C, i.e. inflowing into the supply channel 10 and outflowing from the outflow channel 11.

FIG. 4 shows a crankcase 6 in a plan view. The cutting guide is placed such that the openings 4 can be seen.

FIG. 5 shows an exemplary embodiment in which the flow-guiding device 5 is designed as part of the crankcase 6, as highlighted in the detail E. In this example, the cylinder liner 1 thus has no flow-guiding device 5.

FIG. 6 shows a simplified perspective view of a cylinder liner 1 with a protruding flow-guiding device 5 and an opening 4.

To illustrate the effect of the invention, flow lines of the coolant C are entered, as they result in the installed state of the cylinder liner 1 in a crankcase 6 (not shown) between the wall of the cylinder bore 8 and the cylinder liner. It is clearly expressed that the flow of the coolant C can be effectively controlled via the flow-guiding device 5 together with the openings 4.

FIG. 7a shows a section or a top view of an arrangement of the cylinder liner 1, crankcase 6, cylinder head 7 and outlet valves 13.

A cutting plane is selected at the upper edge of the collar 2 normal to the longitudinal axis of the cylinder liner 1. Further cuts are selected such that the openings 4 in the flow-guiding device can be seen; see also FIG. 4.

In addition to the explanation with reference to FIG. 4, two outlet valves 13 are additionally shown here. The representation is not a cut in the technical sense, but a simplified representation to illustrate the circumstances.

FIG. 7b shows, by way of illustration, temperature profiles along the collar 2 in comparison between the prior art and the invention.

The temperature is plotted over the angle, whereby 360° corresponds to the full circle. The starting point of the imaginary measurement at 0° is shown in FIG. 7a. The abscissa in FIG. 7b is thus the flat projection of an imaginary measuring line in the area of the collar 2.

Looking now at the temperature profile in an arrangement of a cylinder liner and a crankcase according to the prior art, the result is the continuous curve referred to as the "prior art". It can be seen that, in the area of the outlet valves 13 (at approximately 180° and 270°), the temperature has distinct peaks.

In the area of the outflow channel 11, the temperature is at the lowest.

If we consider the temperature profile when using the invention, the result is the dashed curve referred to as "invention". It can be seen that the invention results in a significantly more uniform temperature distribution over a circumference of the collar 2.

The numerical values shown for the temperature are illustrative and may differ significantly between engine models.

LIST OF REFERENCE SIGNS USED

1 Cylinder liner
2 Collar
3 Lateral surface of the cylinder liner
4 Opening
5 Protruding flow-guiding device
6 Crankcase
7 Cylinder head
8 Cylinder bore
9 Cavity
10 Inflow channel
11 Outflow channel
12 Wall of the cylinder bore 8
13 Outlet valve
C Coolant
CD Circumferential direction
SL Surface line

What is claimed is:

1. An apparatus, comprising:
a cylinder liner configured to be disposed in a cylinder bore of an internal combustion engine, wherein the cylinder liner comprises a collar, and a wall disposed circumferentially about an axis, wherein a single flow guiding circumferential rib is disposed circumferentially about the wall and axially spaced from the collar, wherein the single flow guiding circumferential rib comprises at least one axial opening configured to flow a coolant, wherein the at least one axial opening is positioned to circumferentially overlap with at least one outlet valve.

2. The apparatus of claim 1, wherein the single flow guiding circumferential rib is coupled to the cylinder liner.

3. The apparatus of claim 1, wherein, in the presence of exactly one axial opening, the one axial opening accounts for a maximum of 25% of a circumference of the single flow guiding circumferential rib.

4. The apparatus of claim 1, wherein, in the presence of two axial openings, each of the two axial openings accounts for a maximum of 20% of a circumference of the single flow guiding circumferential rib.

5. The apparatus of claim 1, wherein, in the presence of three axial openings, each of the three axial openings accounts for a maximum of 18% of a circumference of the single flow guiding circumferential rib.

6. The apparatus of claim 1, wherein, in the presence of four axial openings, each of the four axial openings accounts for a maximum of 15% of a circumference of the single flow guiding circumferential rib.

7. The apparatus of claim 1, wherein a sum of all axial openings is a maximum of 25% of a circumference of the single flow guiding circumferential rib.

8. The apparatus of claim 1, wherein the single flow guiding circumferential rib, based on a longitudinal extent of the cylinder liner, is arranged in a middle of the cylinder liner, and in an upper third of the cylinder liner facing the collar.

9. The apparatus of claim 1, comprising at least a portion of the internal combustion engine having the cylinder bore, wherein the cylinder liner is disposed in the cylinder bore and is supported by the collar, the single flow guiding circumferential rib is disposed axially between a first coolant cavity along a first portion of the cylinder liner and a second coolant cavity along a second portion of the cylinder liner, and the single flow guiding circumferential rib is disposed axially between a coolant inlet coupled to the first coolant cavity and a coolant outlet coupled to the second coolant cavity.

10. The apparatus of claim 9, wherein the single circumferential rig is coupled to the cylinder bore in the portion of the internal combustion engine.

11. The apparatus of claim 9, wherein the coolant inlet and the coolant outlet are circumferentially offset from one another relative to the axis, the at least one axial opening comprises a first axial opening circumferentially overlapping with the coolant inlet and a second axial opening circumferentially overlapping with the coolant outlet.

12. The apparatus of claim 1, wherein the at least one axial opening circumferentially overlaps with at least one region that is thermally high stressed relative to surrounding regions along the cylinder liner.

13. The apparatus of claim 1, wherein a thickness of the single flow guiding circumferential rib in a radial direction relative to the axis is only partially interrupted by the at least one axial opening.

14. An apparatus, comprising:
 an internal combustion engine comprising a cylinder bore;
 a cylinder liner disposed in the cylinder bore;
 a coolant inlet coupled to a first coolant cavity along a first portion of the cylinder liner;
 a coolant outlet coupled to a second coolant cavity along a second portion of the cylinder liner; and
 a single flow guiding circumferential rib disposed axially between the first and second coolant cavities and axially between the coolant inlet and the coolant outlet, wherein the single flow guiding circumferential rib comprises at least one axial opening configured to guide a coolant flowing between the first and second coolant cavities to at least one region that is thermally high stressed relative to surrounding regions along the cylinder liner, wherein the at least one axial opening circumferentially overlaps with at least one outlet valve.

15. The apparatus of claim 14, wherein a first flow path of the coolant through the first coolant cavity is not interrupted along the cylinder liner between the coolant inlet and the single flow guiding circumferential rib, and a second flow path of the coolant through the second coolant cavity is not interrupted along the cylinder liner between the single flow guiding circumferential rib and the coolant outlet.

16. An apparatus, comprising:
 a cylinder liner, comprising:
  a wall extending circumferentially about an axis;
  a flow guiding circumferential rib disposed circumferentially about the wall, wherein the flow guiding circumferential rib comprises at least one axial opening configured to flow a coolant, wherein the at least one axial opening is positioned to circumferentially overlap with at least one outlet valve;
  a first coolant cavity extending circumferentially about the wall along an upper portion of the flow guiding circumferential rib; and
  a second coolant cavity extending circumferentially about the wall along a lower portion of the flow guiding circumferential rib, wherein a first axial dimension of the first coolant cavity is less than a second axial dimension of the second coolant cavity.

17. The apparatus of claim 16, wherein the at least one axial opening comprises a plurality of axial openings in the flow guiding circumferential rib, and the plurality of axial openings are not uniformly spaced circumferentially about the wall.

18. The apparatus of claim 16, wherein the flow guiding circumferential rib is the only flow guiding circumferential rib disposed on the wall of the cylinder liner.

\* \* \* \* \*